Sept. 15, 1970     F. J. LA LONDE     3,528,721
BICYCLE SAFETY SIGNAL

Filed May 6, 1968     2 Sheets-Sheet 1

INVENTOR
FRED J. LA LONDE

BY Robert M. Dunning
ATTORNEY

Sept. 15, 1970  F. J. LA LONDE  3,528,721
BICYCLE SAFETY SIGNAL
Filed May 6, 1968  2 Sheets-Sheet 2
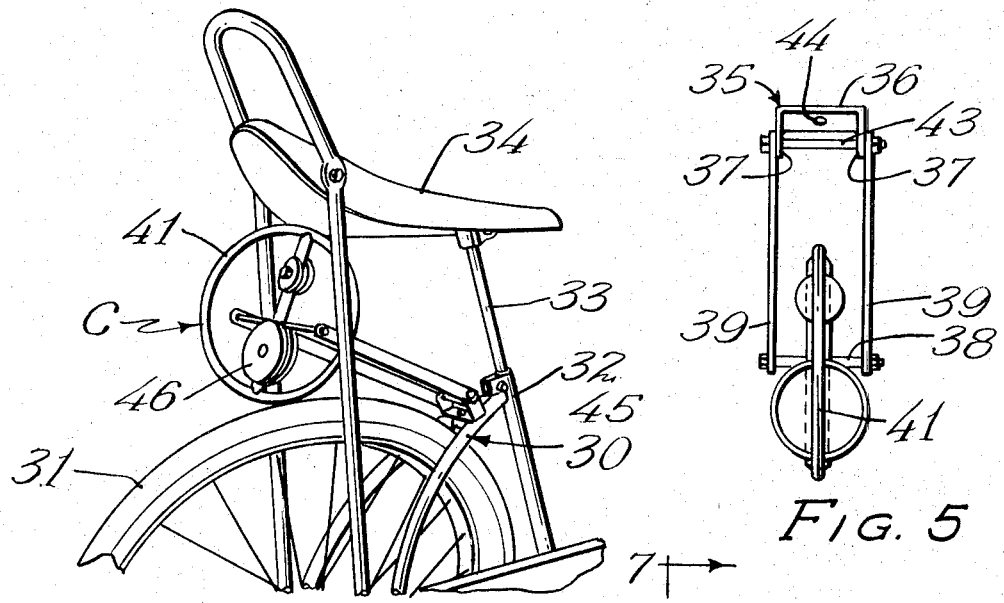
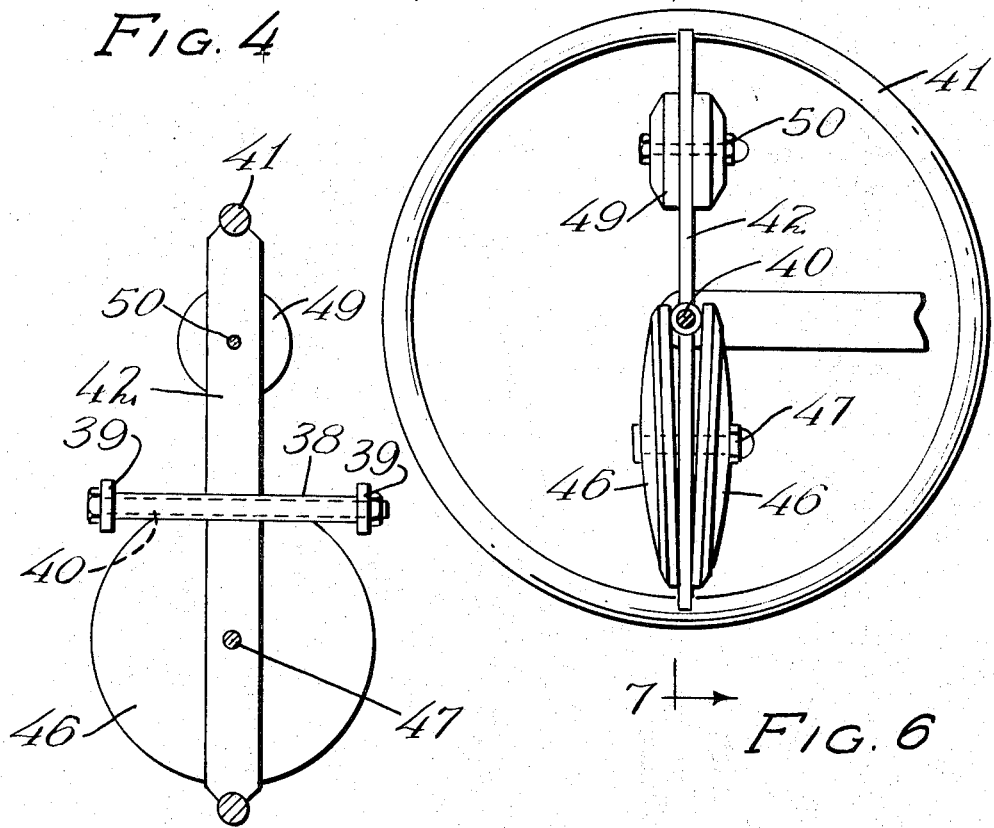
INVENTOR
FRED J. LA LONDE
BY Robert M. Dunning
ATTORNEY

# United States Patent Office 3,528,721
Patented Sept. 15, 1970

3,528,721
BICYCLE SAFETY SIGNAL
Fred J. La Londe, 619–A State St.,
Santa Barbara, Calif. 93101
Filed May 6, 1968, Ser. No. 726,886
Int. Cl. G02b 5/12
U.S. Cl. 350—99          7 Claims

ABSTRACT OF THE DISCLOSURE

This invention comprises a reflector device for bicycles designed to indicate the presence of the bicycle to a following or approaching vehicle. The device comprises a roller engaging a wheel of the vehicle supported on a shaft parallel to the wheel axis. A pair of reflector elements are supported by the shaft to rotate in unison therewith. Each reflector element momentarily reflects light from the headlights of an approaching vehicle. The reflector elements are arranged to provide an alternate flash of reflected light.

---

This invention relates to an improvement in bicycle safety signal and deals particularly with a device for increasing the safety of bicyclists, particularly during the darker hours of the day.

Many accidents occur due to motor vehicles striking bicycles during the periods of the day when it is difficult for the motorist to discern the bicyclists in his path. There are many laws which require bicyclists to equip their bicycles with front and rear lights when traveling on roads between sundown and daybreak. However, most such laws are not very strictly observed. As most bicyclists in this country are under voting age, there is little tendency for the police to cause their arrest for a relatively minor infraction of the rules. On the other hand, if a motor vehicle strikes a bicyclist during the evening or nighttime hours, the driver is usually not held liable for injuries to the bicyclist due to the fact that the bicycle rider has been negligent. Quite often, the rider of the bicycle does not realize that he is violating the law and quite often operates his bicycle when a dangerous condition exists. The present invention is designed to provide a means of protecting the lives of such persons.

A feature of the present invention resides in the provision of a bicycle attachment including a yoke or arm supporting a roller adapted to engage the rear wheel of the bicycle. During its period of operation, the roller is held in engagement with the rear wheel of the bicycle by resilient pressure. The roller acts to rotate a transverse shaft which preferably extends on opposite sides of the roller. Light reflective mirrors are mounted on opposite ends of the shaft which are rotated by rotation thereof. The arrangement is such that in preferred form the headlights of an approaching vehicle will reflect light first in one reflective unit on one side of the roller and then in the other reflective unit on the other side of the roller in order to provide a flashing signal visible to the motorist and providing a warning that the bicycle is ahead.

A feature of the present invention resides in the provision of a pair of reflector units which are preferably red in color which will reflect red flashes from the rear of the bicycle at frequent intervals as the bicycle travels along the road.

A further feature of the present invention resides in the provision of a pair of laterally spaced reflective elements which alternately reflect light from the headlights of a following vehicle in order to warn the following vehicle of the presence of the bicycle even in the absence of headlights and taillights upon the bicycle.

A further feature of the present invention resides in the provision of a device of the type described in which the reflective signal is presented to the following vehicle regardless of the contour of the road. In other words, the vehicle lights reflect from reflectors supported upon a common horizontal axis and will reflect the headlights of a vehicle which is either above or below the level of the bicycle.

In the drawings forming a part of the specification,

FIG. 4 is a perspective view of a modified form of safety signal attachment on the rear wheel of a bicycle.

FIG. 5 is a top plan view of the attachment shown in FIG. 4.

FIG. 6 is an enlarged side elevation view of the rear end of the safety signal.

FIG. 7 is a vertical sectional view through the safety signal, the position of the signal being indicated by the line 7—7 of FIG. 6.

Figure 1:
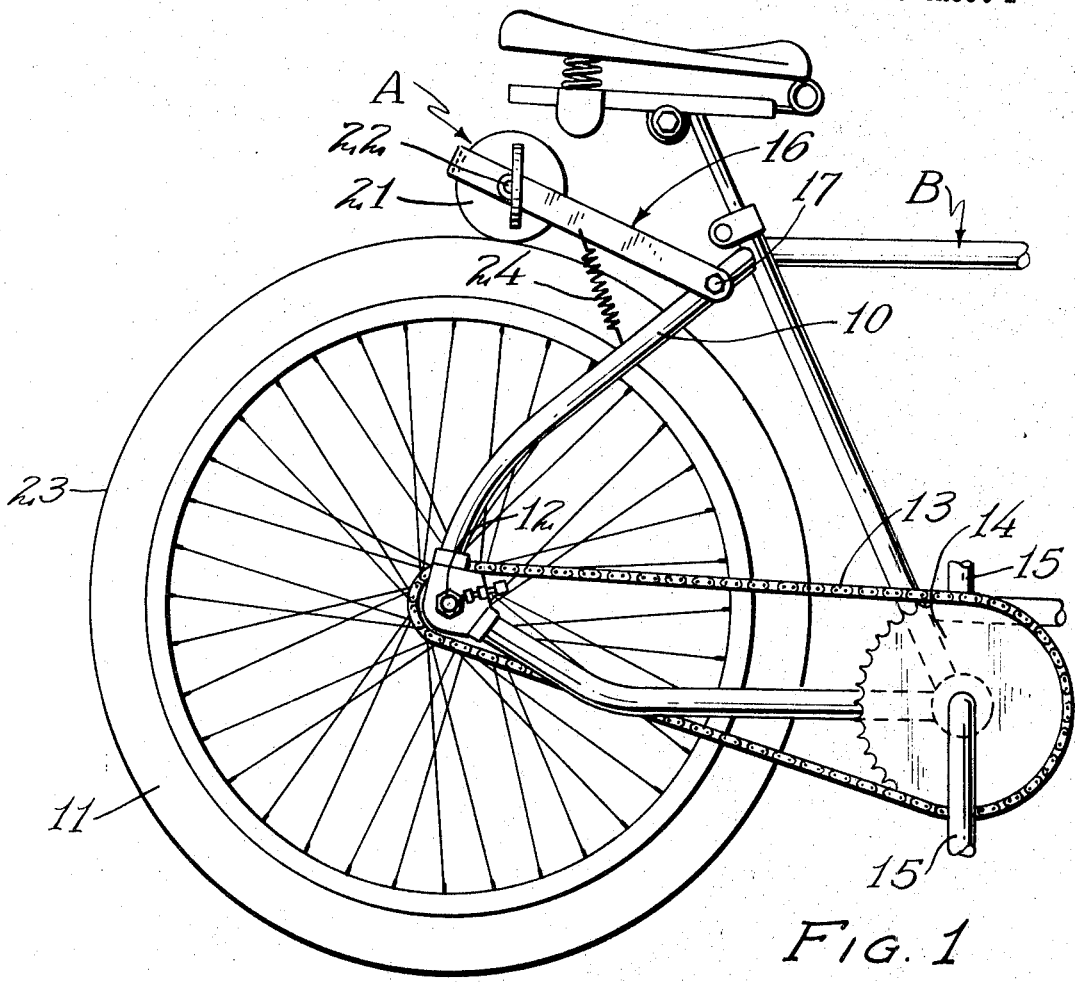
FIG. 1 is a side elevational view of the rear end of a bicycle, showing the device attached thereto.

The reflector unit which is indicated in general by the letter A is designed for attachment to a bicycle, a portion of which is indicated in the drawings and which is identified by the letter B. In the conventional manner, the bicycle B includes a rearwardly and downwardly extending fork 10 which is designed to support the rear wheel 11 of the bicycle.

The rear wheel is rotatable about the axis of the connecting bolt 12, and is normally driven by a chain 13 extending about a sprocket 14 rotated by means of crank or pedal arms such as 15.

The attachment includes a generally U-shaped bracket 16 which is pivotally supported to the rear wheel-supporting fork 10 by a pivot bolt such as 17. The U-shaped bracket 16 includes a pair of generally parallel arms 19 connected at their rear ends by a cross-connecting member 20. A wheel or roller 21 is supported by a pivot 22 extending normally to the sides 19 of the bracket 16. The wheel or roller 21 is designed to ride upon the periphery of the tire 23 on the wheel 11. The roller 21 is preferably held in contact with the tire 23 by means of a spring 24 which connects a side of the bracket 16 to a portion of the fork 10.

Figures 2, 3:
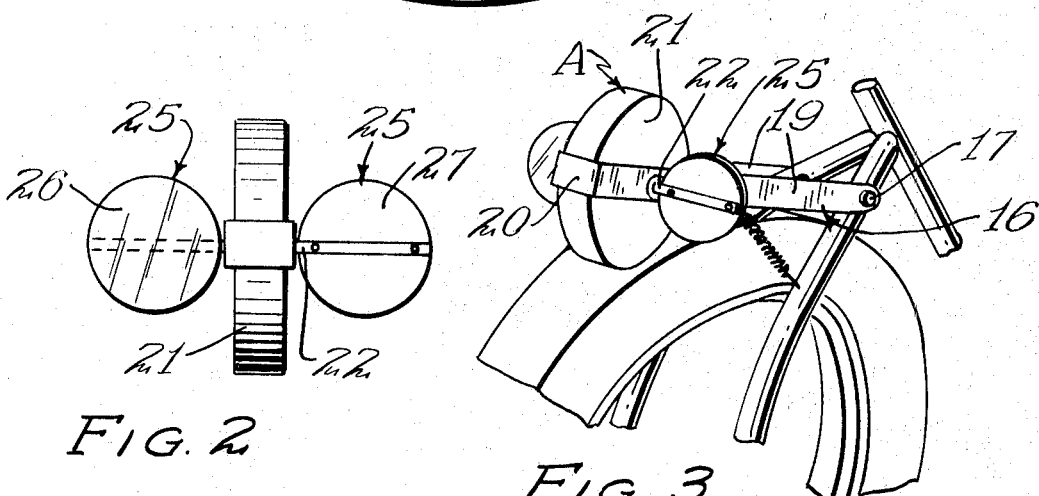
FIG. 2 is a rear elevational view of the attachment removed from the bicycle.
FIG. 3 is an enlarged perspective view showing the manner in which the attachment is attached to the vehicle.

The roller 21 is supported by the pivot shaft 22 which extends outwardly beyond the sides 19 of the bracket 16. The shaft 22 supports a pair of reflector elements 25 which may be double surfaced to reflect on both sides, or which may be attached to opposite ends of the shaft 22 as indicated in FIG. 2 of the drawings with the reflecting surface 26 of one reflector facing in one direction, and the reflected surface of the other extending in the other direction. As indicated in FIG. 2, the rear surface 27 of one reflector is exposed rearwardly while the reflector surface 26 of the other is reflecting light rearwardly. As a result, the device provides alternately reflective elements on either side of the roller 21, in such a manner that the light is first reflected from one reflector and then from the other as the bicycle is moved. With this arrangement, a flashing signal is provided which is somewhat similar to that employed by semaphores located at a railroad crossing. As a vehicle approaches the bicycle, light is first reflected from one reflector 25 and then the other, the two reflectors being laterally spaced. As a result, a flashing signal is produced which is readily apparent to the driver of the oncoming vehicle.

FIGS. 4, 5, 6, and 7 of the drawings show the modified form of signal which is indicated in general by the letter C. As in the previous application, the signal is attached to the fork 30 supporting the rear bicycle wheel 31 near the point of attachment between the fork 30 and the tubular member 32 which adjustable supports the seat support 33 of the seat 34. The signal C includes a generally U-shaped bracket 35 having the base portion 36, and parallel sides 37 which support bracket arms 39. The arms 39 support a transverse pivot 40 which is in parallel spaced relation to the axle of the rear bicycle wheel 31.

The signal C includes a circular ring 41 of metal tubing or the like having a diametrically extending supporting arm 42. The arm 42 is anchored at its ends to the inner surface of the wheel 41. The sleeve 38 encircling the transverse pivot 40 is connected to the center of the cross-member 42. The wheel 41 rides upon the surface of the tire of the rear wheel 31, and the wheel is caused to rotate by this contact. A pivot bolt 43 extends through the parallel sides 37 of the U-shaped bracket 35 to pivotally support the bracket arms 39. The base 36 of the U-shaped bracket is provided with an aperture 44 designed to accommodate a bolt 45 for attaching the U-shaped bracket 35 to the fork 30.

A pair of disc-like reflectors 46 are clamped on opposite sides of the cross-member 42 by means of a clamping bolt 47. The reflector discs 46 are thus arranged in back-to-back relation, and the surfaces of the reflectors are directed rearwardly when the cross-member 42 is in substantially vertical position. When the reflectors are in the position indicated in FIGS. 4 and 6 of the drawings, light will reflect rearwardly from the rearmost reflector 46 which is below the transverse pivot 40. When the wheel 41 has rotated through approximately 180°, the other reflector will reflect light rearwardly from a position above the transverse pivot 40. Thus the reflected light will be visible from the rear of the bicycle first below the pivot 40, and then above the pivot 40, forming a flashing reflected light which changes position during each half rotation of the wheel 41.

In order to maintain the balance of the device, a pair of counter balance weights 49 are clamped to the cross-member 42 by means of a clamping bolt 50, the weights 49 being positioned on the opposite sides of the pivot 40 from the reflectors 46. The weights 49 serve as a counterbalance to compensate for the weight of the reflectors 46, and to permit the wheel 41 to rotate uniformly.

As will be noted, the two structures differ in that in the reflector structure A, the reflected light from a following vehicle behind the bicycle will be reflected first from one side of the transverse center of the roller 21 and then from the opposite side thereof; while the signal C reflects light first from a position below the pivot shaft 40 and then from above this pivot shaft. There are advantages in both constructions but perhaps the best advantage of the reflector C lies in the fact that it is protected from damage by the frame of the bicycle in the event the bicycle falls over while the reflector signal A is somewhat wider and therefor most susceptible to damage. However, in both structures the reflected light is reflected first in one position and then from another as the reflectors are rotated about a horizontal axis.

While the laws of many states require lights on bicycles if they are used after daylight hours, the present device provides at least a substitute for the lights, and permits the presence of the bicycle to be known to the driver of a following vehicle. As a result, if the bicycle is used after daylight hours, the bicycle may be observed and avoided by an oncoming vehicle.

In accordance with the patent statutes, I have described the principles of construction and operation of my improvement in bicycle safety signal, and while I have endeavored to set forth the best embodiment thereof, I desire to have it understood that changes may be made within the scope of the following claims without departing from the spirit of my invention.

I claim:

1. A reflector device for a wheeled bicycle having a bicycle frame, the device including:
   a bracket secured to the frame of the vehicle adjoining the periphery of the rear wheel thereof,
   means pivotally connecting said bracket to said bicycle frame on an axis substantially parallel to the rear wheel transverse support axis,
   a pivot shaft supported by said bracket on an axis substantially parallel to the rear wheel axis,
   wheel means on said shaft engaging the periphery of said rear wheel,
   resilient means urging said wheel means against said rear wheel periphery,
   a pair of reflectors connected to said wheel means and rotatable therewith, said reflectors alternately reflecting light in a rearward horizontal direction from said bicycle with respect to the path of travel thereof from one reflector of said pair and then from the other, and
   said reflectors of said pair being in different positions when reflecting light rearwardly.

2. The structure of claim 1 and in which one reflector is on one side of said wheel means and the other on the opposite side thereof.

3. The structure of claim 1 and in which said reflectors are oppositely facing and on opposite sides of a radial plane through the shaft axis.

4. The structure of claim 1 and in which one of said reflectors reflects light rearwardly when said shaft is in one rotative position and the other reflector of said pair reflects light rearwardly when said shaft is in another rotative position, said positions being substantially one hundred eighty degrees apart.

5. A reflector device for a wheeled bicycle having a frame, the device including:
   a bracket hingedly secured to said frame on axis substantially parallel to the rear wheel transverse support axis, said bracket extending over said rear wheel,
   a roller supported by said bracket on an axis substantially parallel to the rear wheel transverse support axis,
   means resiliently urging said roller against the periphery of said rear wheel for rotation thereby,
   a shaft pivotally connecting said roller to said bracket and extending axially beyond said bracket,
   a reflector mounted on each end of said shaft, the reflective surfaces of said reflectors facing in opposite direction, said reflectors rotating with said shaft and alternately reflecting light in a rearward horizontal direction relative to the path of movement of said bicycle as said bicycle moves over the ground, and
   said rearwardly reflected light being alternately reflected from a reflector on one side of said shaft and then on the other side thereof.

6. A reflector device for a wheeled vehicle having a frame, the device including:
   a bracket hingedly connected to the rear portion of the bicycle frame to extend over the rear wheel thereof,
   the pivot axis of said bracket being generally parallel to the transverse support axis of the rear wheel,
   a wheel means pivotally connected to said bracket on an axis substantially parallel to the rear wheel transverse support axis and engaging the periphery of said rear wheel for rotation, thereof,
   resilient means urging said wheel means against the periphery of the rear wheel,
   a pivot shaft connecting said wheel means to said bracket,
   a radially extending cross member connecting said wheel means to said pivot shaft,
   a pair of reflectors secured in back-to-back position on said cross member, the reflective surfaces of said reflectors being generally on radially extending planes including the axis of said pivot shaft, whereby, one of said reflectors will reflect light rearwardly in a generally horizontal direction relative to the path of movement of the bicycle when the cross member is in a generally vertical position, and the other of said reflectors will direct light rearwardly when said wheel means has rotated to a position at approximately 180 degrees from said first position.

7. The structure of claim 6 and including a counterweight on said cross member on the opposite side of said pivot shaft from said reflectors.

References Cited

UNITED STATES PATENTS

| 2,432,984 | 12/1947 | Budenbom | 350—102 |
| 2,484,142 | 10/1949 | Arnold | 350—97 |
| 2,741,948 | 4/1956 | Parker | 350—99 |
| 2,852,886 | 9/1958 | Parker | 350—99 |

FOREIGN PATENTS

| 99,358 | 12/1961 | Norway. |
| 995,040 | 4/1902 | France. |

PAUL R. GILLIAM, Primary Examiner